April 19, 1949. H. D. SCHLECHTER 2,467,995
RECEPTACLE FILLING MACHINE
Filed Nov. 18, 1944 9 Sheets-Sheet 1

Fig. 1.

Inventor
H. D. Schlechter
By Kimmel & Crowell
Attorneys

April 19, 1949. H. D. SCHLECHTER 2,467,995
RECEPTACLE FILLING MACHINE
Filed Nov. 18, 1944 9 Sheets-Sheet 3

FIG-3

Inventor
H.D. Schlechter
By Kimmel & Crowell
Attorneys

April 19, 1949.   H. D. SCHLECHTER   2,467,995
RECEPTACLE FILLING MACHINE
Filed Nov. 18, 1944   9 Sheets-Sheet 5

April 19, 1949. H. D. SCHLECHTER 2,467,995
RECEPTACLE FILLING MACHINE
Filed Nov. 18, 1944 9 Sheets-Sheet 8

Inventor
H. D. Schlechter
By Kimmel & Crowell
Attorneys

Patented Apr. 19, 1949

2,467,995

UNITED STATES PATENT OFFICE 2,467,995

RECEPTACLE FILLING MACHINE

Herbert D. Schlechter, New York, N. Y.

Application November 18, 1944, Serial No. 564,098

4 Claims. (Cl. 226—2)

This invention relates to receptacle filling machines.

An object of this invention is to provide a receptacle filling machine which is designed to fill receptacles with a predetermined number of articles, such as tablets, pills, capsules, or the like.

Another object of this invention is to provide a receptacle filling machine wherein a number of receptacles may be filled at one time, and wherein the number of articles in each receptacle will be accurate.

Another object of this invention is to provide a machine of this kind which can be used for various types of packaged articles, the machine embodying interchangeable delivery slides so that pills, capsules and other small articles may be delivered to the receptacles in accurately measured quantities.

A further object of this invention is to provide a machine of this kind which includes an endless conveyor disposed beneath a hopper from which the articles are discharged onto the conveyor, and the articles on the conveyor are levelled by means of a levelling rod supported above the conveyor.

With the above and such other objects in view as many hereinafter more fully appear, the invention consists of the novel construction, combination and arrangement of parts as will be more specifically referred to, and illustrated in the accompanying drawings, wherein is shown an embodiment of my invention, but it is to be understood that changes, variations, and modifications may be resorted to which fall within the scope of the invention, as claimed.

Figure 1:
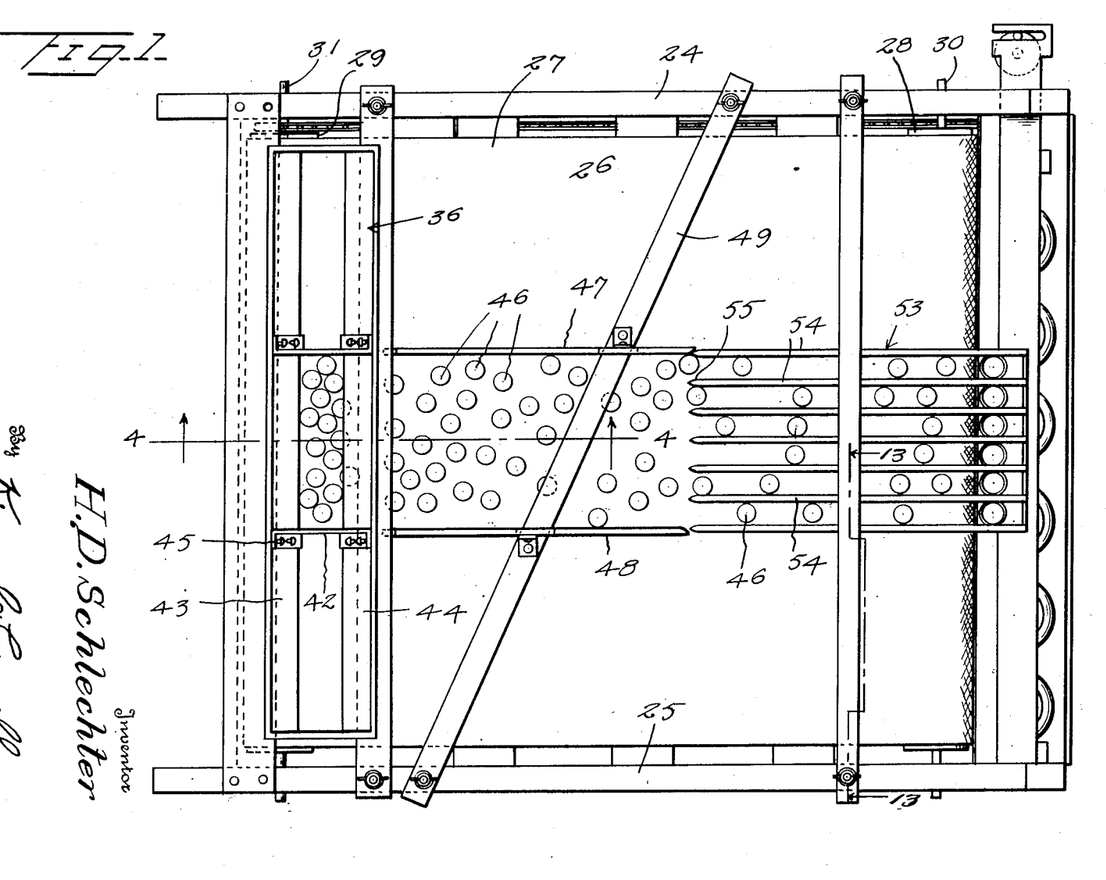
Figure 1 is a detail top plan view of a receptacle filling and counting machine, constructed according to an embodiment of this invention.
Figure 2:
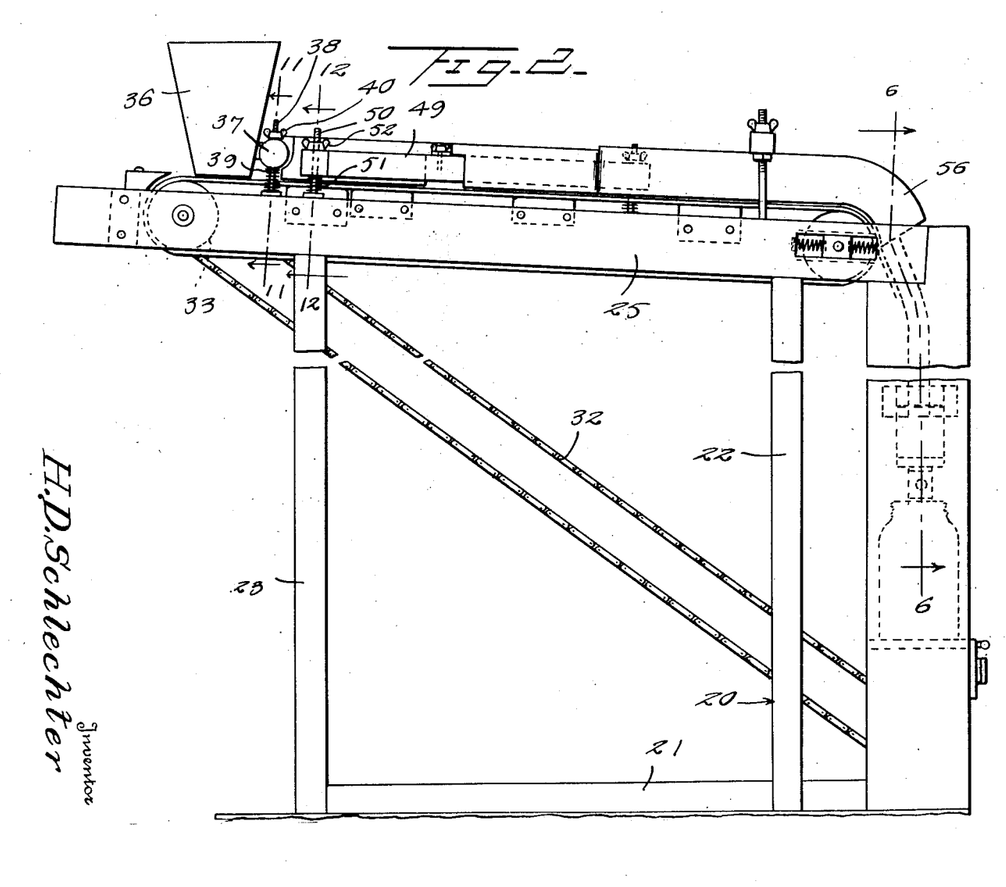
Figure 2 is a detail side elevation, partly broken away, of the machine.
Figure 3:
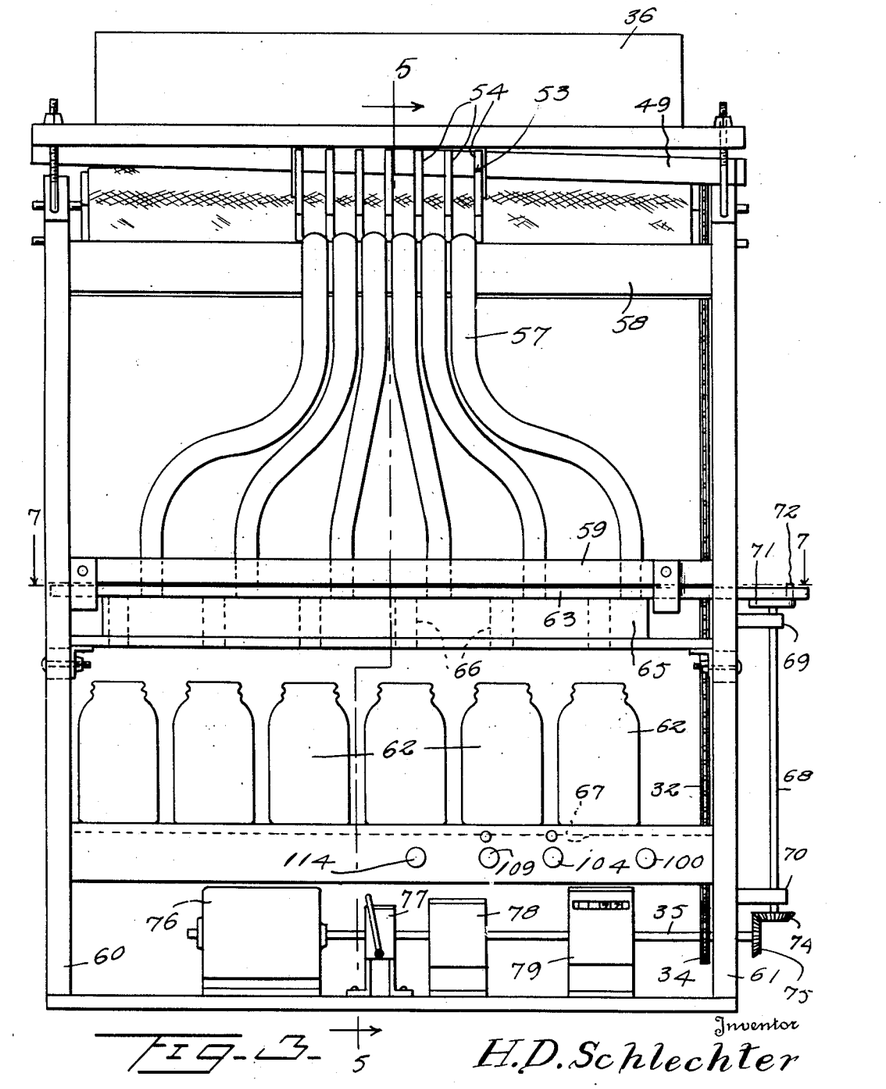
Figure 3 is a detail front elevation of the machine.
Figures 4, 14:
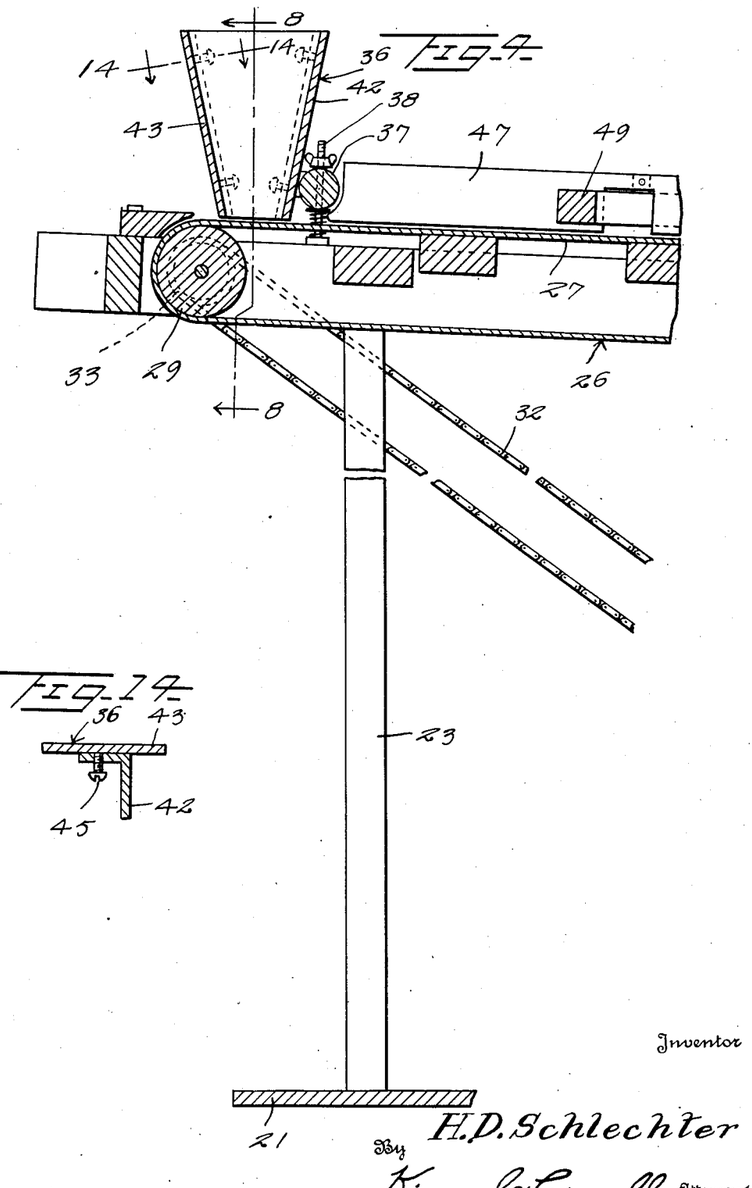
Figure 4 is a sectional view taken on the line 4—4 of Figure 1.
Figure 14 is a fragmentary sectional view taken on the line 14—14 of Figure 4.
Figure 5:
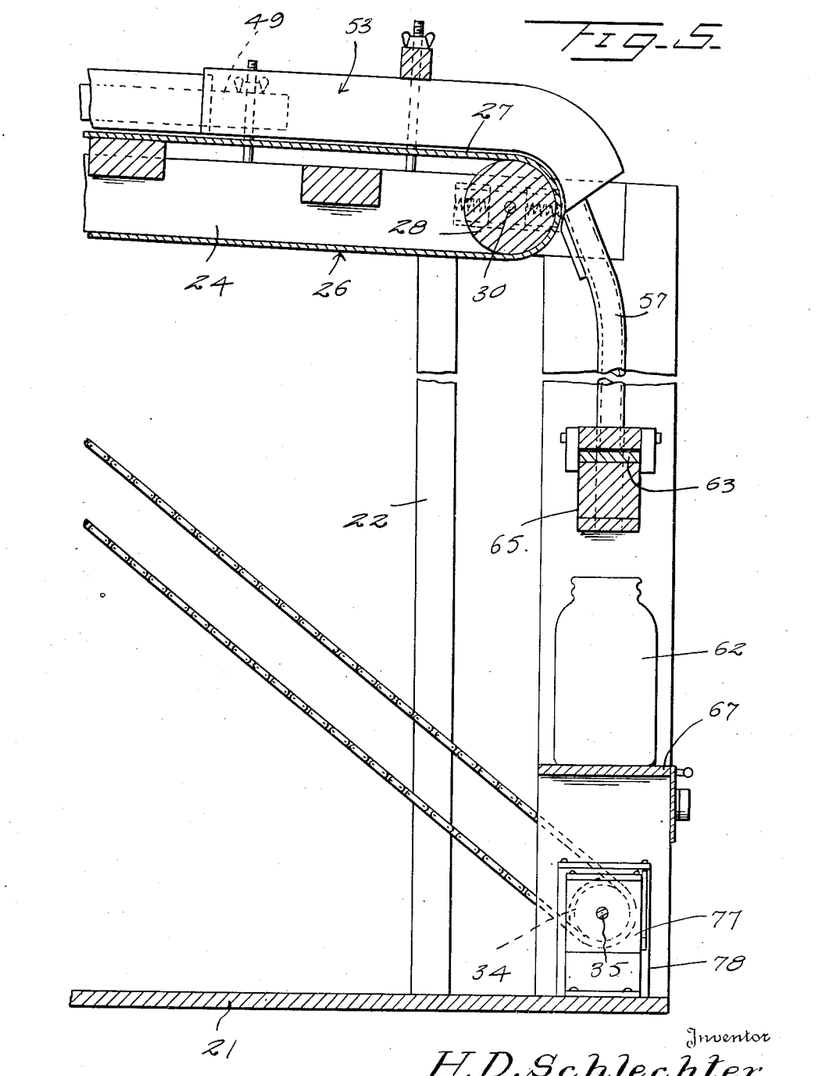
Figure 5 is a segmental view, taken on the line 5—5 of Figure 3.
Figure 6:
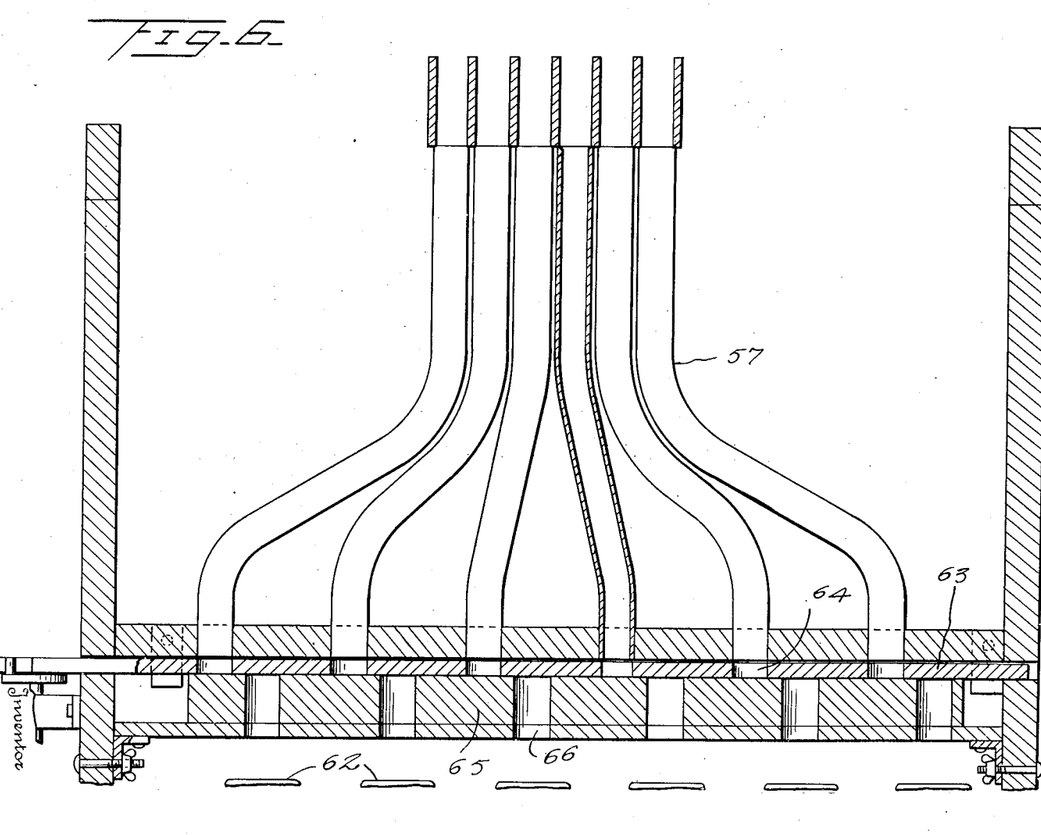
Figure 6 is a sectional view taken on the line 6—6 of Figure 2.
Figure 7:
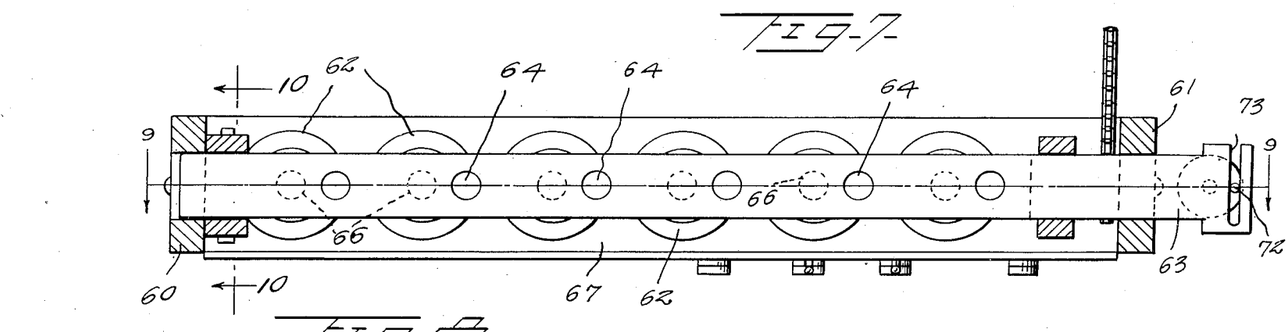
Figure 7 is a sectional view taken on the line 7—7 of Figure 3.
Figure 8:
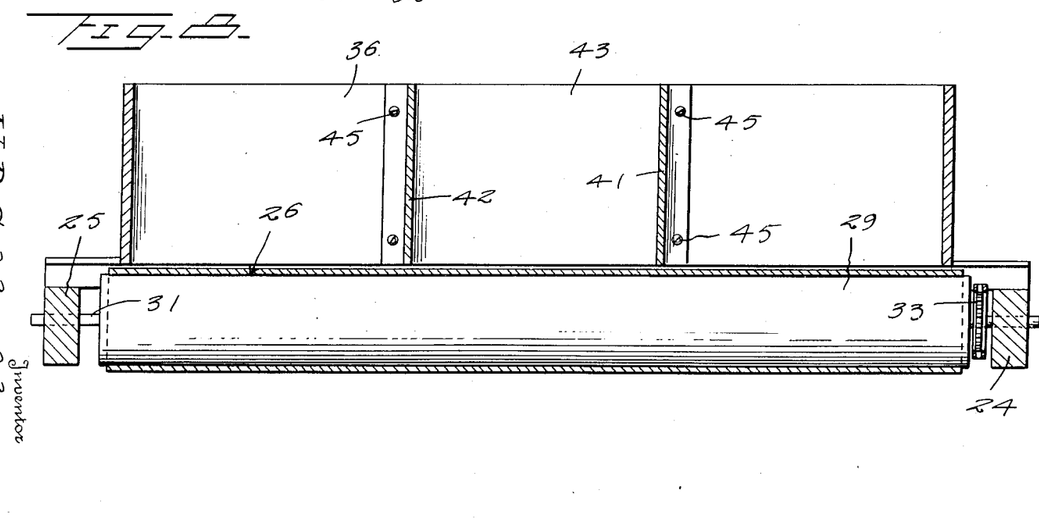
Figure 8 is a sectional view taken on the line 8—8 of Figure 4.
Figures 9, 10, 11, 12:
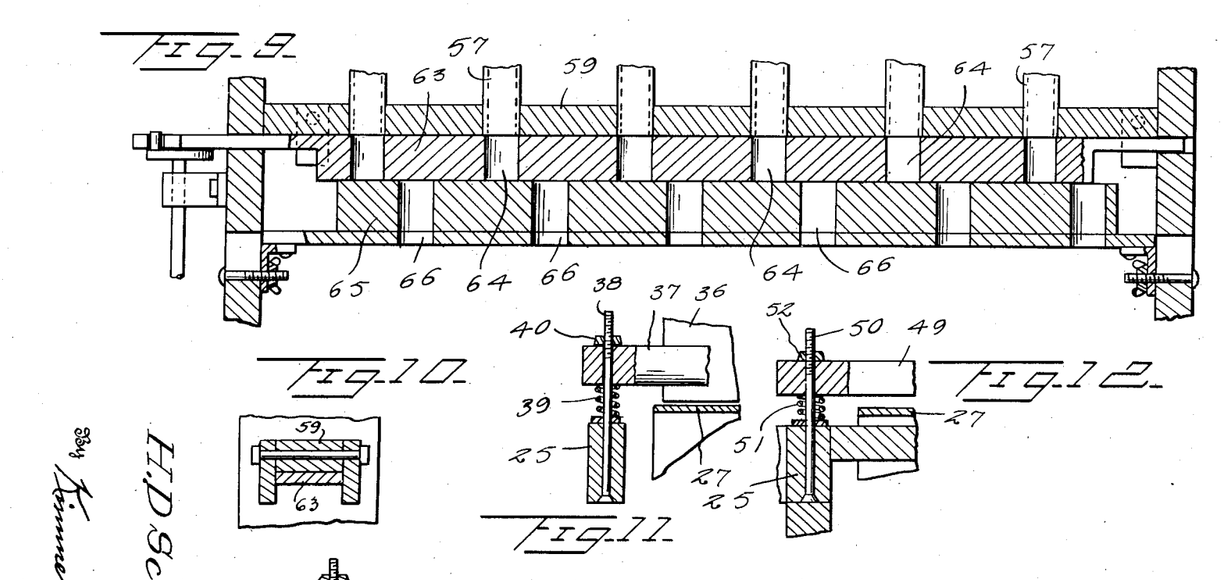
Figure 9 is a sectional view taken on the line 9—9 of Figure 7.
Figure 10 is a fragmentary sectional view taken on the line 10—10 of Figure 7.
Figure 11 is a fragmentary sectional view taken on the line 11—11 of Figure 2.
Figure 12 is a fragmentary sectional view taken on the line 12—12 of Figure 2.
Figure 13:
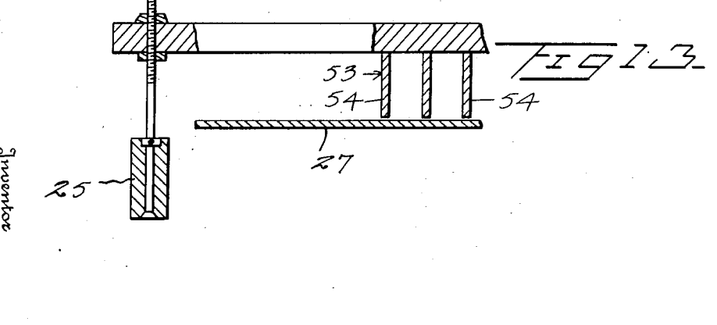
Figure 13 is a fragmentary sectional view taken on the line 13—13 of Figure 1.

Referring to the drawings the numeral 20 designates generally a frame structure including a base 21, having upright front support 22, and upright rear supports 23. A pair of upper side frame members 24 and 25 are secured to the upper ends of the uprights 22 and 23 and preferably the upper frame members 24 and 25 project beyond the front and rear uprights 22 and 23, as shown in Figure 2.

An endless conveyor 26 is movably supported within the frame 20, and preferably between the upper frame members 24 and 25. The conveyor 26 includes an endless belt 27 which is trained over front and rear rollers 28 and 29 respectively The roller 28 is mounted on a roller shaft 30 journalled between the upper frame members 24 and 25. The conveyor 26 inclined to the horizontal, inclining downwardly from the rear end to the forward end.

The conveyor 26 is operated by means of a flexible drive member 32 which is trained over an upper sprocket 33 secured to rear shaft 31. Chain or flexible drive member 32 engages at its lower end over a lower sprocket 34 mounted on a drive shaft 35. A hopper 36 is supported above the rear portion of the conveyor 26 and is secured to a transverse extending supporting rod 37 which engages the upstanding threaded bolts 38 carried by the upper frame members 24 and 25.

A spring 39 is interposed between the lower side of the bar 37 engaging about the bolt 38 so as to resiliently support the hopper 36 above the upper run of the conveyor 26. A wing nut 40 is threaded onto the bolt 38 so that spring 39 may be tensioned to the desired degree. Hopper 36 is of a length substantially equal to the width of conveyor 26 and in order to provide a means whereby the usable portion of the hopper 36 may be shortened I have provided adjustable inner end walls 41 and 42 which are secured in adjusted position along the length of the side walls 43 and 44 of the hopper by means of fastening members 45. The hopper 36 is adapted to have pills or capsules placed therein which are adapted to drop through the open lower end of the hopper onto the upper run of conveyor belt 27. As the upper run or belt 27 moves forwardly and downwardly the articles 46 move with the belt and are confined within a predetermined space on the upper surface of the belt 27 by means of a pair of parallel article guiding walls 47 and 48 which are secured to a transversely extending bar 49. The bar 49 is disposed at an obtuse angle to the length of belt 27 and is supported above the upper run of the belt by threaded posts 50 carried by the upper frame members 24 and 25. A spring 51 is disposed about the post 50 below the bar 49, and is adapted to yieldingly hold bar 49 in selected position above the upper run of the belt. A wing nut 52 is threaded onto the post 50, and provides a means whereby spring 51 may be tensioned to the desired degree and the lower edge of spreader bar 49 may be positioned at a point above the surface of the belt 27 sufficient so that the pills or capsules may pass beneath the spreader bar 49 one at a time. The spreader bar 49 serves to even out the pills which engage on the upper run of the belt so that they will enter the throat of the machine in an even line.

The pills or articles 46 are adapted to enter the throat generally designated as 53 before the articles reach the extreme forward end of the conveyor 27. The throat 53 comprises a plurality of parallel spaced apart article guide members 54 which are formed at their rear ends with tapered portions 55 so that the articles may readily enter between pairs of the guide members 54, but only one article may enter the space between each pair of guide members 54 at a time. The guide members 54 extend forwardly, as indicated at 56, over the forward end of the conveyor where the conveyor engages about roller 28.

A plurality of article guiding tubes 57 are secured at their upper ends to a transversely disposed supporting member 58 and have their upper open ends disposed in a position to receive the articles which are discharged from the belt 27. The article guiding tubes 57 are secured at their lower ends to a horizontally disposed supporting bar 59 secured between a pair of forward upright members 60 and 61. The lower ends of the tubes 57 are spread apart a distance sufficient so that a plurality of receptacles or bottles 62 may be disposed below the supporting bar 59 for receiving the articles as they are discharged in timed relation to the receptacles or bottles 62.

The articles in the lower ends of the tubes 57 are adapted to be discharged to the receptacles 62 by operation of a reciprocating slide 63 which is slidable beneath the horizontal supporting bar 59. The slide 63 is provided with a plurality of openings or pockets 64 which are spaced apart a distance equal to the space between the several tubes 57. The lower bar 65 is disposed below the slide 63 and is formed with a plurality of openings 66 spaced apart a distance equal to the space between openings 64 but offset to one side of the lower ends of the tubes 59. In this manner when slide 63 is at the end of one stroke thereof, openings 64 will register with the lower ends of tubes 57 and at the end of the opposite stroke of slide 63 openings 64 will register with openings 66. When openings 64 register with openings 66 the articles in openings 64 will drop downwardly through openings 66 into receptacles 62.

The receptacles 62 are supported beneath bar 65 by means of a horizontal platform or table 67 secured between the upright forward members 60 and 61.

The slide 63 is reciprocated by means of a vertically disposed rotatable shaft 68 which is journalled in bearings 69 and 70 carried by upright member 61. The upper end of shaft 68 has secured thereto a plate or disk 71 having an eccentric pin 72 fixed thereto, and slidably engaging in a transverse slot 73 formed in the adjacent end of slide 63. The lower end of shaft 68 has secured thereto a beveled gear 74 which meshes with a beveled gear 75 fixed to the adjacent end of drive shaft 35. Drive shaft 35 is operated from a motor 76 and preferably a clutch 77 is interposed in shaft 35 and in addition a reduction gearing 78 of conventional construction is also interposed in shaft 35 so that the latter will turn at a relatively slow speed.

In order to provide a means whereby the motor 76 will automatically stop when a predetermined number of articles have been discharged into the receptacles 62, I have provided a timer, generally designated as 79. The timer 79 is interposed in shaft 35 being operated thereby and includes a timer shaft 80 having a worm gear 81 secured to one end thereof. The worm gear 81 is adapted to mesh with a worm 82 carried by a shaft 35 and the ratio of worm 82 to worm gear 81 is 100 to 1.

Timer shaft 80 has secured thereto a plurality of commutator members 83, 84 and 85. Shaft 80 also has secured thereto a commutator 86 which has a brush 87 connecting therewith, brush 87 being connected by a conductor 88 to one side of a source of electric current supply. Commutator 83 is constructed in the form of an insulated disk 89 fixed to shaft 80, and the periphery of disk 89 has secured thereto a substantially circular contact 90 which is split as at 91 so as to provide a circuit breaking means for breaking the electric circuit, as will be hereinafter described.

Commutator 84 includes an insulated disk 92 having secured to the periphery thereof a pair of substantially semi-circular contacts 93 which have their ends spaced apart so as to provide a circuit breaking space 94.

Commutator 85 is constructed in the form of an insulated disk 95 having a plurality of segmental contact strips 96 secured to the periphery thereof, there being four of these contact strips, with their ends spaced apart as at 97 to provide a circuit breaking space.

A wiper 98 is adapted to engage commutator 83 and is connected to a conductor 99 which is connected to one side of the motor 76. A manually operable switch 100 is interposed between conductor 99 and wiper 98. A pilot light 101 is interposed in a wire 102 which is connected between wiper 98 and a pilot light commutator 103 fixed to and electrically connected with shaft 80. The wiper 103 is adapted to engage commutator 84 and has connected therewith a switch 104 to conductor 91.

The pilot light 105 is connected by means of wire 106 to a pilot commutator 107 electrically connected to shaft 80, and connector 106 is connected to wiper 103. A wiper 108 engages commutator 85 and is connected to conductor 90 through a switch 109. A pilot light 110 is interposed in a wire 111 which is connected at one end to wiper 108 and at the other end engages a commutator 112 electrically connected to shaft 80. The several contact strips or segments on the commutators 83, 84 and 85 are electrically connected with shaft 80 so that electric current from one side 88 of the source of current supply will flow through commutator 86, shaft 80, and through a selected one of commutators 83, 84 and 85, depending on which one of the switches 100, 104 and 109 respectively is closed.

Motor 76 is connected at the opposite side thereof by means of a conductor 113 to the opposite side of the source of electric current supply. A starting or bridging switch 114 is connected between conductors 88 and 99 at a point to shunt timer 79 and is spring-pressed by means of a spring 115 to normally open position. Switch 114 is designed for the purpose of starting motor 76 when the brush associated with a selected commutator, is at the circuit breaking position. When motor 76 starts operating and the brush of the selected commutator is past the circuit breaking position, switch 114 may be released and motor 76 will operate for a predetermined period. Commutator 85 and switch 109 are designed to stop the operation of motor 76 when slide 63 has reciprocated a sufficient number of times to drop 25 articles into receptacles 62. Commutator 84 and switch 104 are designed to operate motor 76 and stop the motor after 50 capsules have been dropped into receptacle 62, whereas, commutator 83 and switch 100 are designed for operating motor 76 and cutting off this motor when 100 capsules have been dropped into receptacles 62.

In the use and operation of this machine the articles in the form of pills or capsules are dropped into hopper 36. Motor 76 is started by closing a selected one of the switches 100, 104, or 109, and then closing switch 114. As an example, switch 109 may be closed so that 25 articles will drop into receptacles 62 before the motor 76 is stopped. When motor 76 operates, drive shaft 35 will rotate shaft 64 through gears 74 and 75, and conveyor 26 will be operated through chain 32. The articles dropping downwardly through the open lower end of hopper 36 will engage on the upper run of conveyor belt 27 and will be moved forwardly beneath the hopper and between the guide walls 47 and 48.

As the articles pass beneath spreader member 49 this member will spread out the articles in a flat manner, and the articles will then pass into the open rear ends of the pairs of guide members 54. The articles entering the throat 53 of the machine will move between the pairs of guide members 54 and will then be discharged into the upper open ends of guide tubes 57. Tubes 57 will normally be substantially filled with articles so that when slide 63 reciprocates the articles will drop one at a time into pockets 64 of slide 63 at the time the slide 63 has the openings thereof in registry with the lower ends of tubes 57. When slide 63 moves out of registry with tubes 57 openings 64 will move into registry with openings 66 and at the time openings 64 register with openings 66 the articles will drop downwardly through the latter openings into receptacles 62. Contact strips 96 of commutator 85 are so arranged that when shaft 80 is rotated a quarter turn, whereas shaft 35 is rotated 25 turns, wiper 108 will be positioned at the circuit breaking point 97 and motor 76 will stop operating.

With a machine as hereinbefore described the receptacles 62 will have an accurate count of articles dropped thereinto, thereby eliminating inaccuracies which have heretofore occurred by prior counting devices which contemplated spreading the articles over a plate having a predetermined number of openings therein and filling such openings. Under this latter procedure certain openings would not become filled with articles so that an inaccurate number of articles would be placed in the desired receptacles.

With a machine as hereinbefore described the slide 63 may be of any desired thickness preferably being of a thickness equal to the thickness of the pill or capsule and if different thicknesses of articles are to be discharged into the receptacles a different thickness slide can be used.

Figures 15, 16, 17:
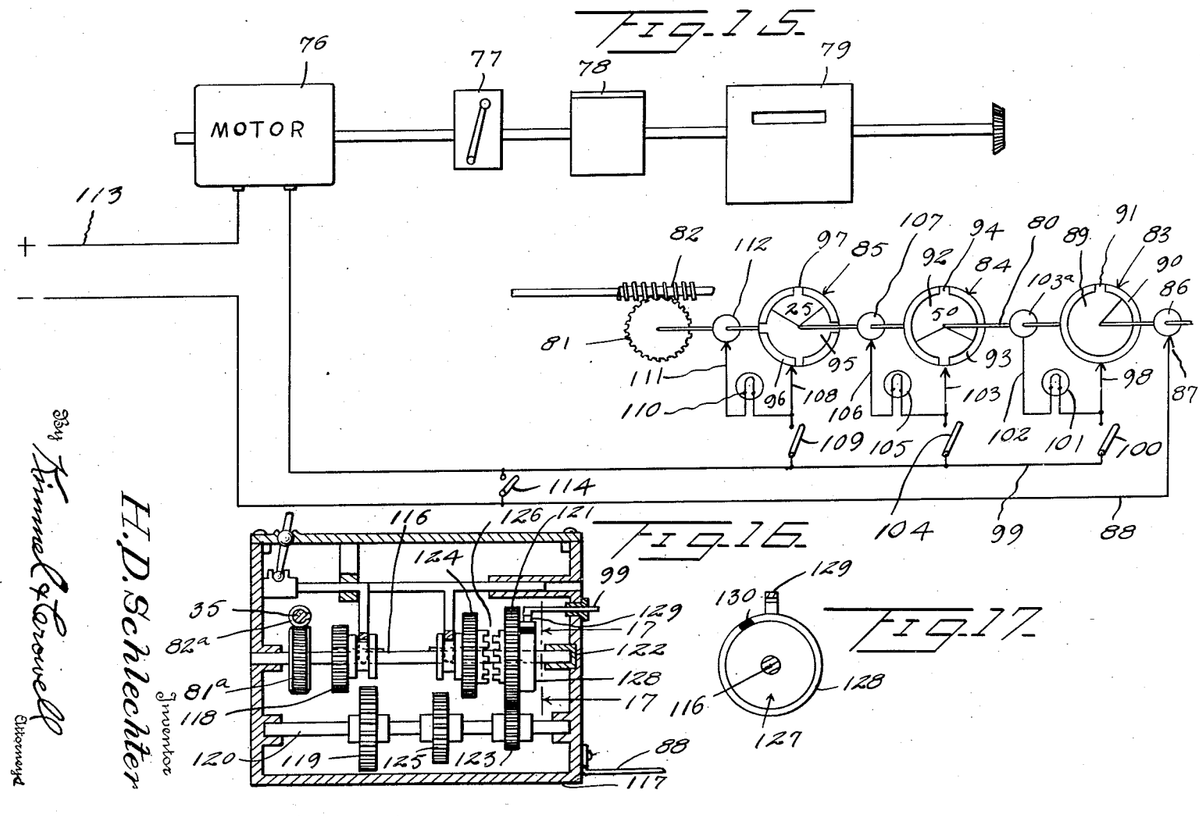
Figure 15 is a diagrammatic view showing the electric circuits embodied in this invention.
Figure 16 is a sectional view of a modified form of timer.
Figure 17 is a sectional view taken on the line 17—17 of Figure 16.

In Figures 16 and 17 there is disclosed a modified form of timer which is constructed in the form of a conventional three-speed transmission. Drive shaft 35 has a worm 82a meshing with a worm gear 81a mounted on a counter shaft 116, which is journalled in a housing 117. A shiftable low speed gear 118 is slidable on shaft 116 and is adapted to mesh with a gear 119 fixed on a second countershaft 120 journalled in housing 117. A driven gear 121 meshes with a gear 123 fixed on shaft 120. An intermediate speed gear 124 is slidable on shaft 116 and is adapted to mesh with a gear 125 fixed on shaft 120. Gear 124 and gear 121 are formed with complementary clutch elements 126 by means of which high speed is obtained. A commutator 127, having a split contact band 128 is fixed on hollow shaft 122 and a wiper 129 engages contact band 128 and is connected to wire 99.

Housing 117 is connected to wire 88 and the remaining structure shown in Figure 15 will be associated with the timer shown in Figures 16 and 17.

When gear 118 is in mesh with gear 119 the commutator will rotate at a speed whereby slide 63 will drop 25 pills or capsules; when gear 124 is in mesh with gear 125 slide 63 will drop 50 pills or capsules; and when clutch members 126 are in engagement slide 63 will drop 100 pills or capsules. When commutator 127 makes one complete revolution and wiper 129 engages the split or insulated portion 130, motor 76 will start and the cycle can be repeated by again closing switch 114 which starts up motor 76.

I claim:

1. In a receptacle filling machine for filling receptacles with a predetermined number of articles, comprising a hopper, an endless conveyor for carrying the articles from the hopper, guide means extending from said conveyor; a reciprocating member at the discharge end of said guide means, said reciprocating member formed with openings for receiving a single article therein at one end of the stroke thereof, and discharging the articles from said member at the other end of its stroke, a motor for said reciprocating member, a variable transmission including inter-engaging driving gears and a driven gear between said motor and said member, circuit connecting contact members engageable in timed relation to said driven gear, said contact members being connected in the motor circuit for breaking said circuit at certain positions of said driven gear in selected timed relation to the cycle of said reciprocating member, whereby said receptacles may be filled with a selected number of articles, and the motor circuit broken at that time.

2. In a receptacle filling machine for filling receptacles with a predetermined number of articles, comprising a hopper, an endless conveyor for carrying the articles from the hopper, guide means extending from said conveyor; a reciprocating member at the discharge end of said guide means, said member formed with openings for receiving a certain number of articles therein at one end of the stroke and discharging the articles at the other end thereof, an electric motor driving said member, a rotatable timing means operatively connected in the motor circuit and driven by said motor, said timing means including a rotating segmental contact member and a fixed contact engageable therewith for breaking the motor circuit upon a definite number of revolutions of said rotating contact member in timed relation to said motor and said reciprocating members.

3. In a receptacle filling machine as set forth in claim 2, said timing means including a plurality of rotating segmental contact members, the segmental contacts of each of said segmental contact members being of different lengths, a fixed contact member for each of said segmental members, and switching means for selectively connecting a certain one of said segmental members in the motor circuit.

4. In a receptacle filling machine as set forth in claim 2, said timing device including a variable transmission between said motor and said segmental contact member for varying the relation of said segmental member relative to said motor.

HERBERT D. SCHLECHTER.

REFERENCES CITED

The following references are of record in the file of this patent:

UNITED STATES PATENTS

| Number | Name | Date |
| --- | --- | --- |
| 1,237,315 | Eby | Aug. 21, 1917 |
| 1,404,591 | Frederickson | Jan. 24, 1922 |
| 1,416,763 | Thom | May 23, 1922 |
| 1,607,899 | Long | Nov. 23, 1926 |
| 1,714,534 | Weber | May 28, 1929 |
| 1,754,047 | Reaves | Apr. 8, 1930 |
| 1,844,806 | Smith | Feb. 9, 1932 |
| 2,046,302 | Bowes | June 30, 1936 |
| 2,060,645 | Suffiger | Nov. 10, 1936 |